United States Patent [19]

Hasuda et al.

[11] Patent Number: 5,664,247
[45] Date of Patent: Sep. 2, 1997

[54] SHUTTER BRAKE MECHANISM

[75] Inventors: Masanori Hasuda; Takashi Matubara, both of Kanagawa-ken, Japan

[73] Assignee: Nikon Corporation, Tokyo, Japan

[21] Appl. No.: 614,018

[22] Filed: Mar. 12, 1996

[30] Foreign Application Priority Data

Jun. 15, 1995 [JP] Japan .................. 7-174240

[51] Int. Cl.$^6$ .................................................. G03B 9/40
[52] U.S. Cl. ............................................ 396/456; 396/484
[58] Field of Search .................................. 354/246, 248, 354/249, 250, 252; 396/453, 454, 455, 456, 484, 492

[56] References Cited

U.S. PATENT DOCUMENTS

| | | | |
|---|---|---|---|
| 4,657,366 | 4/1987 | Tanabe et al. | 354/246 |
| 4,829,329 | 5/1989 | Toyoda et al. | 354/252 |
| 4,847,649 | 7/1989 | Toyoda et al. | 354/252 |
| 5,034,765 | 7/1991 | Nemoto et al. | 354/246 |

*Primary Examiner*—A. A. Mathews
*Attorney, Agent, or Firm*—Oliff & Berridge

[57] ABSTRACT

A durable brake mechanism comprises shutter blades; arms that support the shutter blades; drive pins, which are linked to the arms and cause the shutter blades to move by driving the arms; and brake levers, which contact the drive pins and apply a braking force against the motion of the drive pins. The brake levers have a hardness greater than a hardness of the drive pins that prevents damage to shutter blades and improves the durability of the shutter blades.

11 Claims, 2 Drawing Sheets

SHUTTER BRAKE MECHANISM

BACKGROUND OF THE INVENTION

1. Field of the Invention

The invention relates to a shutter brake mechanism for use in a photographic device, such as a camera. The shutter brake mechanism can prevent damage to shutter blades and improve the durability of the shutter, shutter blades and brake mechanism.

2. Description of Related Art

A known shutter blade travel motion brake mechanism in a camera is disclosed in Japanese Laid-Open Patent Publication Sho JP 61-251830. In JP 61-251830, FIG. 7, a drive transfers a friction torque to a brake lever. The friction torque is created by the lever being pressed against a washer by a disc spring. A driving pin then contacts a brake lever near the completion of a blade travel motion mechanism's action. A braking action is applied to the blade travel motion mechanism through the friction torque. In conventional devices, a surface hardness of the brake lever is Hv 450 to 550, and the surface hardness of the driving pin is Hv 700–800, where the surface hardness is a Vicker's hardness (Hv), and represents the value for a 100 g load. Hereafter, all surface hardnesses will be established according to the Vicker's hardness.

Recently, the need to increase a camera's speed, by boosting the speed and maximum time of the shutter, has grown. Consequently, it has become necessary to increase the blade travel motion mechanism's speed. However, by increasing the speed, the shutter blades incurs increased damage. The degree of damage to the shutter blades depends on the strength of the blades themselves. Thus, it is necessary to strengthen the brake mechanism with an increased brake speed to prevent damage.

In conventional devices, when the spring force is increased, the created friction torque is also enlarged. A driving pin makes contact with the brake lever near the completion of the blade travel motion mechanism's motion. The driving pin collides with the brake lever at high speed. Accordingly, when the friction torque of the brake lever is increased without other modifications, the driving pin and brake lever are damaged. Thus, the performance of the brake mechanism decreases and the durability of the shutter is decreased.

The above-described damage will not occur at a blade travel motion time with a 2.9 ms shutter blind speed. However, damage of brake lever and driving pin occurs from a small number of shutter actions, when the shutter blind speed is 2.5 ms. When the shutter blind speed is faster than 2.2 ms, the damage was extreme and the shutter blades were repeatedly damaged. The shutter blind speed is defined as the time required for the slit edge of the shutter blades to pass through the picture plane.

When, as in conventional devices, the surface hardness of the brake lever is less than the surface hardness of the driving pin, the damage to the brake lever is extreme. As a result of the increased impact force, damage to the shutter blades will also increases.

The degree of damage depends on the thicknesses and surface hardnesses of the brake lever and the driving pin. It is possible to decrease the damage to the brake lever and the driving pin, while increasing the contact surface area between the brake lever and the driving pin, if the thickness of the brake lever is increased. Additionally, by increasing the surface hardness of the brake lever and the driving pin, it is also possible to reduce damage thereto. However, increasing the thickness of the brake lever causes the shutter to have a larger size. When the surface hardness brake lever and of the driving pin are increased, the ability to withstand impact decreases. Further, the brake lever or driving pin may crack because the driving pin collides with the brake lever at high speeds.

SUMMARY OF THE INVENTION

It is an object of the invention to provide a durable brake mechanism, which can prevent damage to the shutter blades and improve the durability of the shutter, shutter blades, and brake mechanism.

In order to achieve the above and other objects, the camera shutter brake mechanism of the present invention comprises at least one shutter blade and an arm that holds the at least one shutter blade. Driving pins are linked to the arms and cause the at least one shutter blade to be moved. Brake levers contact the driving pins and apply a braking force to the driving pins. The hardness of the at least one brake lever is greater than the hardness of the driving pins to reduce the damage to the brake levers. Thus, it is possible to increase the durability of the brake mechanism and to prevent damage to the shutter blades.

Another object of the invention can be achieved by providing a shutter brake mechanism comprising at least one shutter blade, at least one driving member, and at least one brake lever. The at least one driving member includes a contact part having a larger thickness than a non-contact part of the driving member.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
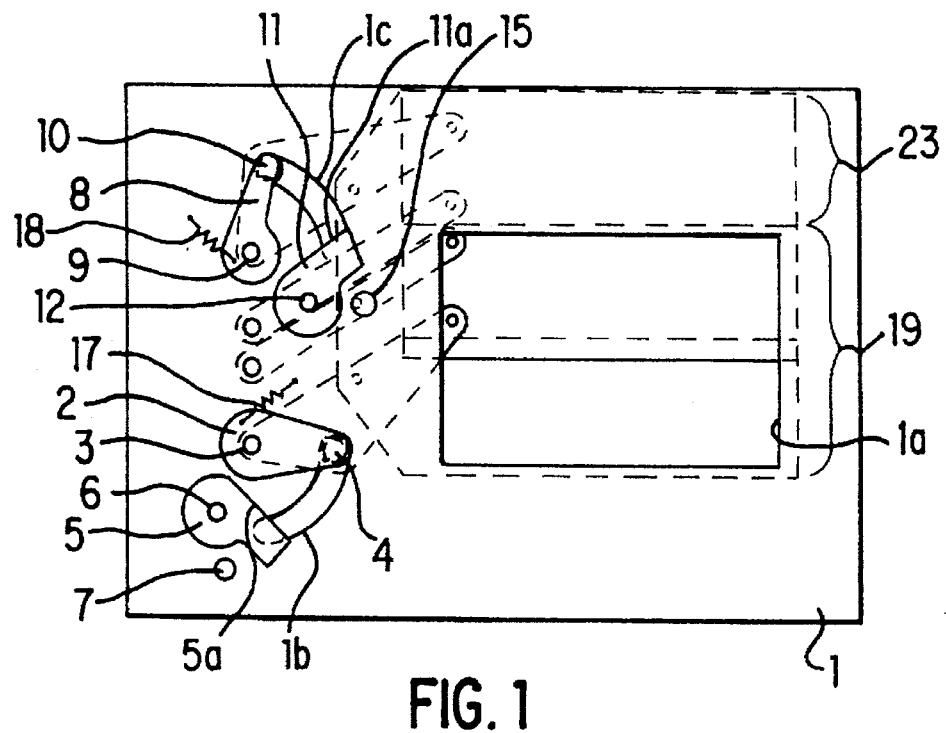
FIG. 1 is a plan view illustrating a first preferred embodiment of the camera shutter brake mechanism according to the invention.

FIG. 1 is a plan view illustrating a first preferred embodiment of the camera shutter brake mechanism. FIG. 1 illustrates the brake mechanism's position after shutter charging and prior to an exposure action.

An exposure aperture 1a is located in a substrate 1. A front blind drive lever 2 is attached to the substrate 1, and rotates in a clockwise direction, around a front blind drive lever shaft 3 provided on the substrate 1. A front blind drive pin 4 is attached to the front end of the front blind drive lever 2, and extends through a crescent-shaped guide hole 1b in the substrate 1. The guide hole 1b defines a range of movement for the front blind drive pin 4.

A front blind brake lever 5 is attached to the substrate 1 so as to rotate on a front blind brake shaft 6. A friction torque is applied to the brake lever 5 by a known mechanism (not shown). The front blind brake 5 is positioned so the front blind drive pin 4 and a surface 5a of the front blind brake 5 make contact near the completion of the clockwise rotation of the front blind drive lever 2. Thus, a braking action is applied to the front blind drive lever 2. A front blind brake stopper 7 restricts the rotation of the front blind brake lever 5.

A rear blind drive lever 8 is attached to the substrate 1, and rotates around a rear blind drive lever shaft 9. The shaft 9 is provided on the substrate 1. A rear blind drive pin 10 extends through substrate 1 at the front end of the rear blind drive lever 8. A crescent-shaped guide hole 1c defines a range of movement for the rear blind drive pin 10.

A rear blind brake lever 11 rotates around a rear blind brake shaft 12 provided on the substrate 1. A friction torque is applied to the brake lever 11 by a known mechanism (not shown). The rear blind brake 11 is positioned so the rear blind drive pin 10 and a surface 11a of the rear blind brake lever 11 make contact near the completion of the clockwise rotation of the rear blind drive lever 8. Thus, a braking action is applied to the rear blind drive lever 8. A rear blind brake stopper 15 restricts the clockwise rotation of the rear blind brake lever 11.

A front blind drive spring 17 has one end attached to the front blind drive lever 2, while the other end is attached to the substrate 1. The front blind drive spring 17 applies a biasing force to the front blind drive lever 2. A rear blind drive spring 18 has one end attached to the rear blind drive lever 8 and the other end is attached to the substrate 1. The rear blind drive spring 18 applies a biasing force to the rear blind drive lever 8.

A front blind mechanism 19 comprises a known four-part link mechanism, which includes a plurality of blades supported by arms. The front blind mechanism 19 is linked to the front blind drive pin 4. The front blind mechanism 19 opens and closes the aperture 1a in the substrate 1 based on movement of the front blind drive lever 2.

A rear blind mechanism 23, similar to the front blind mechanism 19, comprises a known four-part link mechanism, which also includes a plurality of blades supported by arms. The rear blind mechanism 23 is linked to the rear blind drive pin 10. The rear blind mechanism 23 opens and closes the aperture 1a based on movement of the rear blind drive lever 8. Moreover, the front blind drive lever 2 and the rear blind drive lever 8 are held in the positions illustrated in FIG. 1 by an mechanism (not shown), which oppose the biasing forces of the front blind drive spring 17 and the rear blind drive spring 18.

Figure 2:
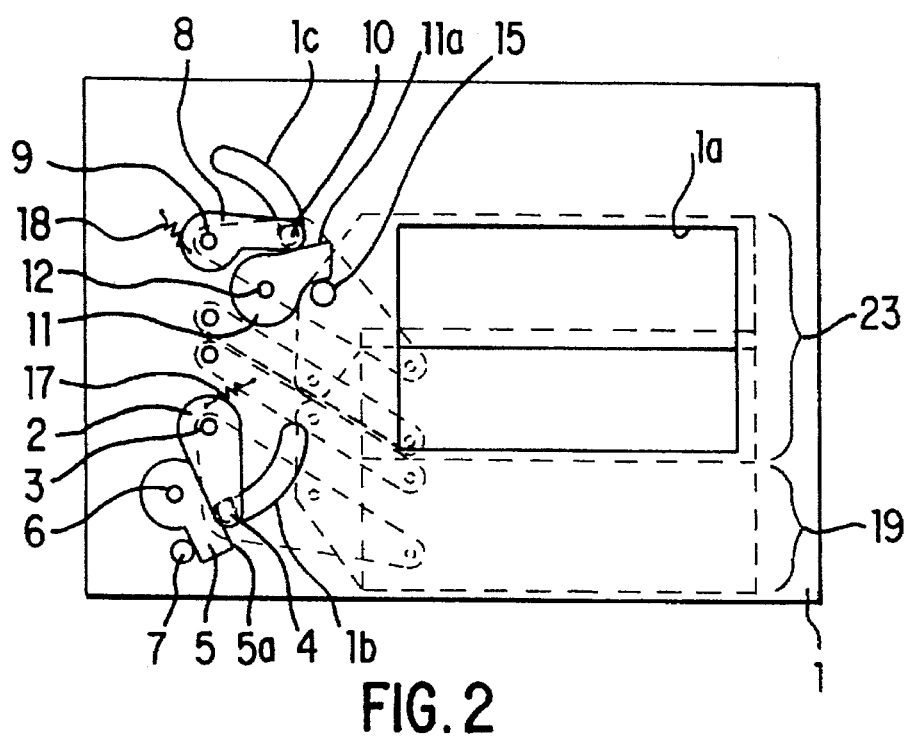
FIG. 2 is a plan view illustrating the camera shutter brake mechanism.
Figure 3:
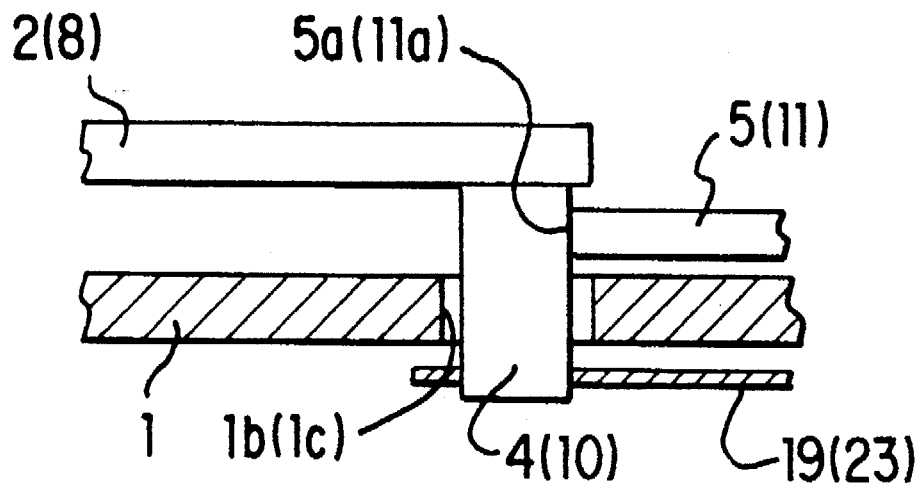
FIG. 3 is a cross-sectional view illustrating the camera shutter brake mechanism.

FIG. 2 is a plan view illustrating the shutter position after completion of an exposure. FIG. 3 is a cross-sectional view of a portion of the brake mechanism. The rear brake mechanisms are indicated by the numbers in parentheses in FIGS. 2 and 3 as the front blind brake mechanism and the rear blind brake mechanism have the same structure.

Next, the action of the shutter will be described. First, the front blind drive lever 2 is released. The front blind drive lever 2 is rotated by the front blind drive spring in a clockwise direction. The front blind mechanism 19 opens the aperture 1a, and an exposure action is started. Near the completion of the front blind drive lever 2, the front blind drive pin 4 contacts the surface 5a of the front blind brake lever 5. The front blind brake lever 5 rotates in a clockwise direction. A braking action is applied to the front blind drive lever 2 through a friction torque applied to the front blind brake lever 5. The motion of the front blind drive lever 2 is complete when the front blind brake lever 5 contacts the front blind brake stopper 7.

After a predetermined exposure time has elapsed, the rear blind drive lever 8 is released. The rear blind drive lever 8 is rotated clockwise by the rear blind drive spring 18. The rear blind mechanism 23 then starts to cover the aperture 1a. Near the completion of the motion of the rear blind drive lever 8, the rear blind drive pin 10 contacts the surface 11a of the rear blind brake lever 11. The rear blind brake lever 11 then rotates in a clockwise direction. A braking action is applied against the motion of the rear blind drive lever 8 via the rear blind drive lever 11. The rear blind drive lever 8 motion is complete when the rear blind brake lever 11 contacts the rear blind brake stopper 15. The completion of the above operations defines a complete exposure action. Following the exposure action, a charging operation is conducted by a known charge mechanism (not shown), and the device is restored to the position illustrated in FIG. 1.

Next, a description of the brake mechanism and operation are provided. In the front brake mechanism, the front blind drive pin 4 contacts with the surface 5a of the front blind brake lever 5. The speed of the front blind drive pin 4 is high is near completion of its motion. Additionally, the front blind brake lever 5 is stationary. Consequently, the impact force at contact is quite large. In the words, the front blind drive pin 4 collides with the surface 5a of the front blind brake lever 5 with a high impact, so that dents or gashes are created.

Damage is also created on the front blind drive pin 4. However, if the damage to the front blind brake lever 5 is greater than the damage to the front blind drive pin 4, the brake mechanism's performance deteriorates, and the frequency of damage to the shutter blades increases. The durability of the shutter decreases. The same damage occurs in the rear blind brake mechanism 23.

Experiments were conducted using various combinations of the surface hardnesses and thicknesses for the front blind brake lever 5 and the surface hardnesses of the front blind drive pin 4, in order to solve the above-noted problems. A thickness of the front blind brake lever 5 is set in the range of approximately 0.4 mm to 1.0 mm, the surface hardness for the front blind brake lever 5 is set in a range approximately Hv 700–900. Further, the surface hardness for the front blind drive pin 4 is set in a range of approximately Hv 500–700. Thus, the surface hardness of the front blind brake lever 5 is at least as great as the surface hardness of the front blind drive pin 4. Additionally, a second surface hardness for the front blind brake lever 5 is set in a range of approximately Hv 500–700, and the surface hardness for the front blind drive pin 4 is set in a range of approximately Hv 400–500.

The surfaces can be hardened by an appropriate known process, such as carburization, nitrization, plating or the like. Both the brake levers and the drive pins are formed of iron-based materials and are liquid carburized. The liquid carburization method consists of immersing the material in a saline bath at around 700°–800° C. Nitrogen and carbon infiltrate the material. Quenching and tempering follow, where the desired surface hardness can be obtained by varying the tempering temperature. After carburization of both the brake lever and the drive pin, the brake lever can be nickel plated. Thus, the surface hardness of only the brake lever can only be increased.

With the surface hardness of the brake lever and drive pin set, durability tests or the resulting shutter were conducted for both surface hardnesses. Substantially no damage to the front blind brake lever 5 occurred with a speed of at least 2.2 ms. Dents and gashes in the front blind drive pin 4 were minor, and cracks did not occur. Damage to the shutter blades did not occur. Similar results were obtained for the rear blind brake lever 11 and the rear blind drive pin 10.

As a comparison example, the surface hardness of the brake lever was changed, from the conventional hardness range of approximately Hv 450–550, to a hardness set in the range of approximately Hv 600–700. The surface hardness of the drive pin was maintained set in a range approximately Hv 700–800. At these hardnesses, the brake lever and the blades were damaged.

Thus, merely increasing the surface hardness of the brake lever above conventional levels did not prevent blade damage. It is necessary to provide the brake lever surface hardness greater than the surface hardness of the drive pin to prevent damage. The results of the test for the first and second surface hardnesses and the comparison example at 2.2 ms are shown in TABLE 1. When the surface hardness of the brake lever is above Hv 900, cracks occurred. Therefore, even when the blind speed is 2.9 ms, the invention can improve the durability of a shutter unit.

TABLE 1

|  | Brake lever surface hardness | Drive pin surface hardness | 2.2 ms motion test results |
| --- | --- | --- | --- |
| First Surface Hardness | Hv 700–900 | Hv 500–700 | no blade damage |
| Second Surface Hardness | Hv 500–700 | Hv 400–500 | no blade damage |
| Comparison example | Hv 600–700 | Hv 700–800 | blade damage created |

Figure 4:
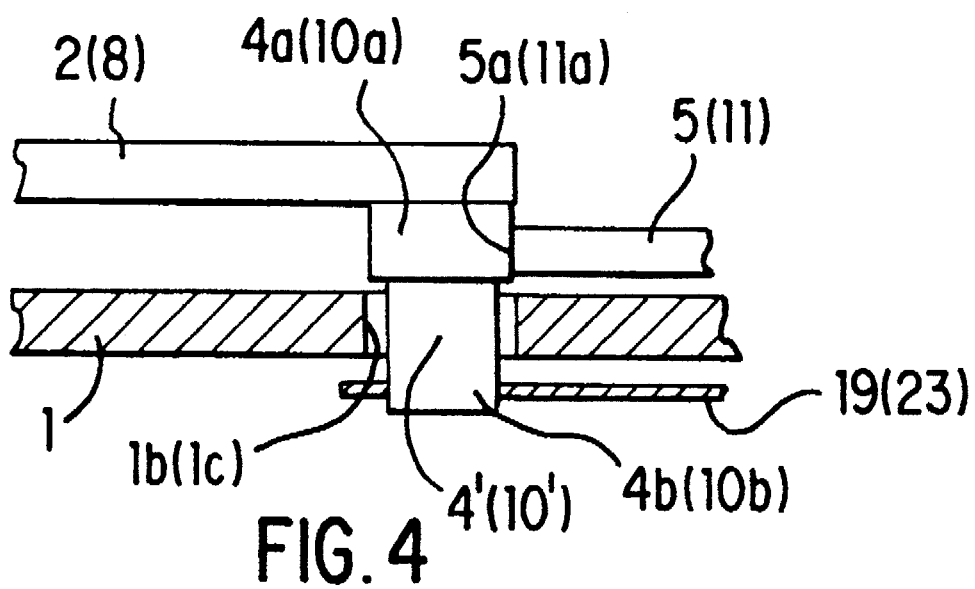
FIG. 4 is a cross-sectional view illustrating a second preferred embodiment of the camera shutter brake mechanism.

FIG. 4 illustrates a second preferred embodiment of the invention. FIG. 4 is a cross-sectional view similar to that of FIG. 3. Because the front blind brake mechanisms and the rear blind brake mechanisms have similar structure, the rear brake mechanisms are indicated in parentheses.

The structure of FIG. 4 differs from that in FIG. 3 as the first blind drive pin 4' includes a stepped portion 4a and a remainder portion 4b. The stepped portion 4a is located between the front blind drive lever 2 and the substrate 1, and contains at least the section of the first blind drive pin 4' in contact with the front blind brake lever 5. The diameter of the stepped portion 4a is larger than the diameter of the remainder portion 4b, which is connected with the front blind mechanism 19. Similarly, the rear blind drive pin 10' includes a stepped portion 10a and a remainder portion 10b.

It is possible to minimize the impact force on the front blind brake lever 5 when the front blind drive pin 4' contacts the surface 5a of the front blind brake lever 5. Accordingly, damage, such as dents and gashes in the front blind brake lever 5, is prevented. The brake performance does not deteriorate and the durability of the shutter is improved. Similar results occurs in the rear blind drive pin 10'.

Enlarging the diameters of the stepped portion 4a of the front blind drive pin 4' and of the stepped portion 10a of the rear blind drive pin 10' also prevents damage to the brake lever. This is more effective than increasing the thickness of the respective brake levers. Furthermore, because only the portion of the drive pin that contacts the brake lever is enlarged, the associated mass increase is relatively small. Accordingly, only a small increase in the energy is needed to drive the front blind mechanism 19 and the rear blind mechanism 23.

Durability tests at the blind speeds of greater than 2.2 ms were conducted after setting the front blind drive pin 4' and the front blind brake lever 5 with a surface hardness set in a range approximately Hv 500–700. The diameter of the stepped portion 4a of the front blind drive pin 4' is set at a range approximately 2.6–3.5 mm, and the thickness of the front blind brake lever 5' is set in a range approximately 0.4–1.0 mm. No damage to the front blind brake lever 5 occurred. Dents and gases to the front blind drive pin 4' were slight, and no cracks were created therein. As a result, the shutter blades incurred no damage. Similar results were also obtained for the rear blind brake lever 11 and the rear blind drive pin 10'.

By providing a stepped portion on the drive pin, it is possible to prevent damage to the brake lever, even when the surface hardness of the drive pin and of the brake lever are the same. However, by providing a brake lever surface hardness greater than the drive pin surface hardness, it is possible to further prevent damage to the brake lever, making it possible to further increase the shutter durability.

With the above camera shutter brake mechanism, it is possible to decrease the amount of damage to the brake lever by making the brake lever hardness is greater than the drive pin hardness. Consequently, the durability of the brake mechanism can improve and damage to the shutter blades can be prevented.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A shutter brake mechanism for use in a camera, the shutter brake mechanism comprising:

at least one shutter blade;

at least one driving mechanism for moving the at least one shutter blade;

at least one driving pin that contacts the at least one driving mechanism; and at least one brake lever that provides a brake force to the at least one driving mechanism by contacting the at least one driving pin;

wherein a hardness of the at least one brake lever is greater than a hardness of the at least one driving pin.

2. The mechanism of claim 1, further comprising:

at least one arm that holds the at least one shutter blade; and at least one drive arm, each at least one drive arm being linked to the at least one arm, the at least one drive arm causing the at least one shutter blade to move by driving a corresponding at least one arm.

3. The mechanism of claim 2, wherein the surface hardness of the at least one brake lever is greater than the surface hardness of the at least driving pin.

4. The mechanism of claim 3, wherein the brake lever has a Vicker's hardness in the range of approximately Hv 500 to Hv 900 when a measured load is 100 g; and the at least driving pin has a Vicker's hardness in the range approximately Hv 400 to Hv 800 when a measured load is 100 g.

5. The mechanism of claim 2, wherein the at least one brake lever has a Vicker's hardness in the range of approximately Hv 500 to Hv 900, when a measured load is 100 g; and the at least driving pin has a Vicker's hardness in the range approximately Hv 400 to Hv 800, when a measured load is 100 g.

6. A shutter brake mechanism for use in a camera, comprising:

at least one shutter blade;

at least one driving member that moves the at least one shutter blade; and at least one brake lever that provides a braking force to the at least one driving member by contacting the at least one driving member;

wherein the at least driving member comprises at least one contact part that contacts the at least one brake lever, and at least one non-contact part that does not contact the at least one brake lever, the at least one contact part having a larger thickness than the at least one non-contact part and wherein a hardness of the at least one brake lever is greater than a hardness of the at least one driving member.

7. The mechanism of claim 6, further comprising:

at least one arm that holds the at least one shutter blade;

at least one driving pin, each at least one driving pin being linked to the at least one arm, the at least one driving pin causing the at least one shutter blade to move by driving a corresponding at least one arm; and wherein the at least one contact part of the at least one driving member comprises the at least one driving pin.

8. The mechanism of claim 7, wherein the at least one driving pin has a diameter at the at least one contact part larger than a diameter of the at least one non-contact part.

9. The mechanism of claim 6, wherein the brake lever has a Vicker's hardness in the range of approximately Hv 500 to Hv 900 when a measured load is 100 g; and the at least driving pin has a Vicker's hardness in the range approximately Hv 400 to Hv 800 when a measured load is 100 g.

10. A shutter brake mechanism for use in a camera, comprising:

at least one shutter blade;

at least one driving member that moves the at least one shutter blade; and at least one brake lever that provides a braking force to the at least one driving member by contacting the at least one driving member;

wherein the at least driving member comprises at least one longitudinally extending pin element having a stepped portion that contacts the at least one brake lever when the braking force is applied and a remainder portion disposed opposite to said stepped portion and having a thickness smaller than said stepped portion.

11. The mechanism of claim 10, wherein a hardness of the at least one brake lever is greater than a hardness of the at least one driving member.

* * * * *